UNITED STATES PATENT OFFICE.

HARRY B. LAMBERT, OF NORTH PELHAM, NEW YORK, ASSIGNOR OF ONE-HALF TO MILTON HARRIS. OF NEW YORK, N. Y.

ALUMINUM SOLDER.

No. 906,637.　　Specification of Letters Patent.　　Patented Dec. 15, 1908.

Application filed March 16, 1908. Serial No. 421,360.

*To all whom it may concern:*

Be it known that I, HARRY B. LAMBERT, residing in the town of North Pelham, county of Westchester, and State of New York, whose post-office address is Box No. 163, Pelham, New York, have invented a new and useful Improvement in the Processes of Soldering Aluminum to Aluminum and Aluminum to other Metals, of which this is a specification.

This invention relates to the process of soldering aluminum to aluminum and aluminum to other metals by means of the compound of which the following are the constituents and ingredients:

My composition consists of the following ingredients combined approximately in the proportions stated, viz: The following is the percentage of composition of the said aluminum solder by weight: Tin 68%, zinc 29%, antimony 2%, phosphorus 1%. These different compositions of matter are to be thoroughly heated separately to a liquid form, then thoroughly mixed and allowed to cool off and then put on the market in what is commonly known as bar solder.

In soldering aluminum to aluminum or aluminum to other metals no effective method has yet been found to keep such metals soldered together permanently when put to the use for which such metals are intended. For a very long time and as far as is known, no aluminum solder has yet been invented or put upon the market which, when tried and tested, has been found to be of any practical commercial value. Manufacturers of aluminum have for a great number of years endeavored to secure an aluminum solder which would stand the usual chemical tests and ordinary usage. This aluminum solder will stand the usual chemical tests and ordinary usage, and is therefore of practical commercial value.

All aluminum solders that have in any way come to the notice of your petitioner are in liquid form, whereas the present solder comes in bar form.

The cheapest solder of aluminum or of aluminum to other metals known at the present time which have come to the notice of petitioner, retail approximately about four dollars ($4.) per pound, but through this process I will be enabled to retail said aluminum solder at fully one half that price.

What I claim and desire to secure by Letters Patent of the United States, is—

The herein-described composition of matter, consisting of tin, zinc, antimony, and phosphorus used for the purpose of soldering aluminum to aluminum and aluminum to other metals substantially as herein described and for the purpose specified herein.

HARRY B. LAMBERT.

In the presence of—
　MILTON HART,
　SAMUEL SOBEL.